April 25, 1933.    W. MÖLLER    1,905,401

MEASURING APPARATUS

Filed Feb. 27, 1930    3 Sheets-Sheet 1

INVENTOR:
Waldemar Möller
BY Edward H. Palmer, ATTY

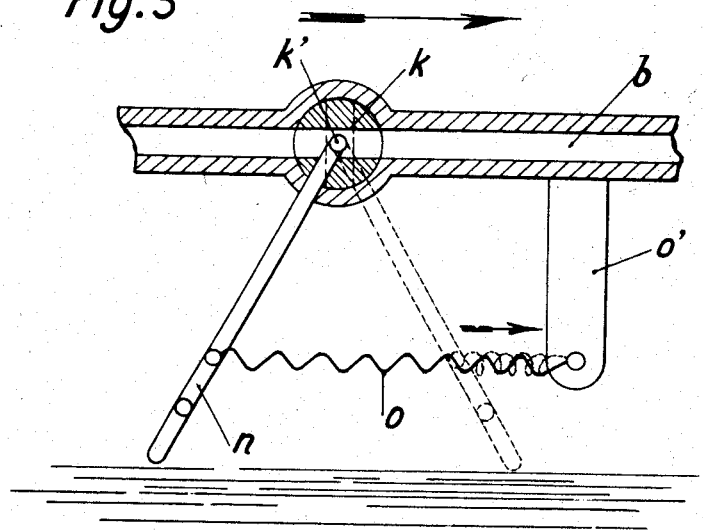
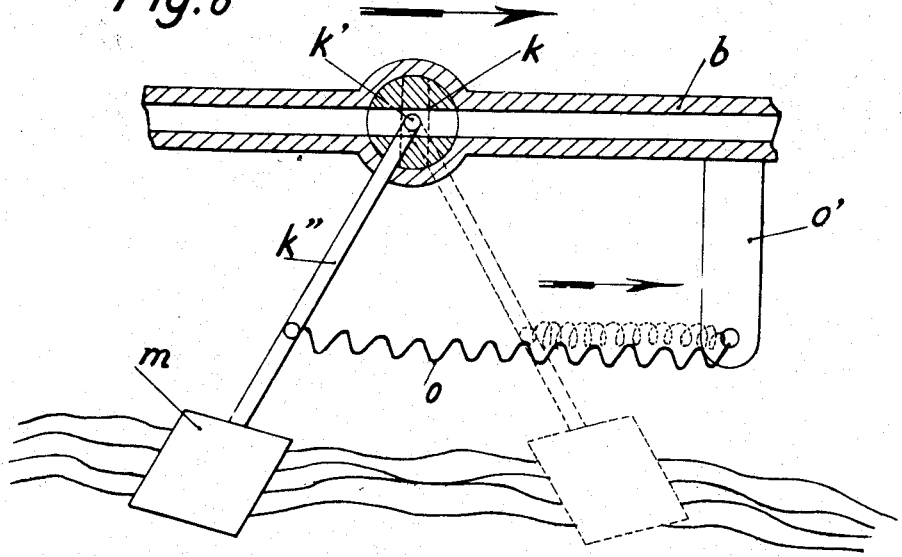

Patented Apr. 25, 1933

1,905,401

UNITED STATES PATENT OFFICE

WALDEMAR MÖLLER, OF BERLIN-CHARLOTTENBURG, GERMANY, ASSIGNOR TO ASKANIA-WERKE AKTIENGESELLSCHAFT, OF BERLIN-FRIEDENAU, GERMANY, A CORPORATION OF GERMANY

MEASURING APPARATUS

Application filed February 27, 1930. Serial No. 431,951, and in Germany March 18, 1929.

This invention relates to measuring apparatus and more particularly to distance measuring apparatus. The invention is especially useful for measuring distances travelled by vehicles, and more particularly although not exclusively, by air craft.

The invention and its aims and objects will be best understood from the following description taken in connection with the accompanying drawings of two embodiments of the invention herein described and shown for illustrative purposes, the true scope of the invention being more particularly pointed out in the appended claims.

In the drawings:

Figs. 5 and 6 show convenient illustrative means for controlling the valve $k$.

Figure 1:
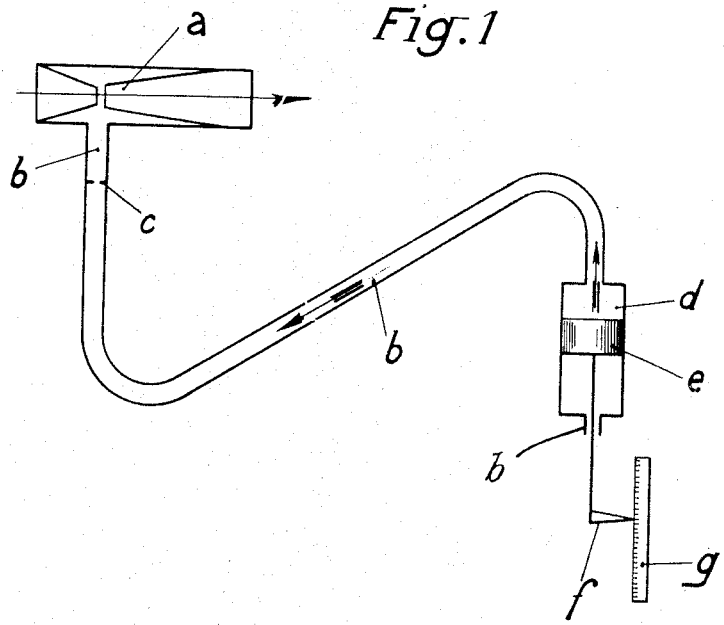
Fig. 1 is a diagrammatic sectional view of one illustrative embodiment of the invention.

In accordance with my invention, I provide means carried by the vehicle, and operative when the vehicle is in motion, to render the device operative. I may employ any suitable means for this purpose within the scope of my invention. As one illustrative convenient means to this end I may use a Venturi tube $a$ which may be secured to the air craft or other vehicle so as to move with it through the air when the vehicle is in motion. As is well known to those skilled in the art, the movement of a Venturi tube through the air produces at the narrowest part or throat of said tube a condition of partial exhaust which is a quadratic function of the speed $v$, with which the air streams pass the Venturi tube. At the narrowest portion of the Venturi tube, there is connected a passage $b$ provided interiorly with a constriction $c$. At the other end, said passage is connected with measuring means comprising an indicator and actuating means therefor. In the illustrative embodiment of the invention shown in Fig. 1, said actuating means may conveniently comprise a cylinder $d$ having a piston $e$ movable therein and said indicating means may conveniently comprise an index $f$ connected to said piston and adapted to move over a scale $q$. The piston is fitted in the cylinder so as to move practically without friction therein and said cylinder will preferably be disposed horizontally so that said piston shall be freely movable within the cylinder.

Since, as already stated, a condition of partial exhaust exists within the conduit at that side of the constriction towards the Venturi tube, which condition of partial exhaust is a quadratic function of the relative speed of the air relatively to the Venturi tube, and since on the other hand, in view of the free mobility of the piston $e$ within the cylinder $d$, the pressure at the other side of said constriction is that of the outer atmosphere, there will be produced at said constriction a pressure differential resulting in air being drawn through the constriction in the direction indicated by the arrow, so that a flow of air is induced through the apparatus in the direction mentioned. It is well known however that the speed of travel of the air through or past said constriction is a radical function of the pressure differential existing in front of and behind said constriction. Consequently the speed of the air is a linear function of the speed $v$ with which the outer air streams past the Venturi tube and said speed $v$ is the speed with which the vehicle is moving relative to the air.

The flow of air produced through the tube $b$ as above set forth causes the piston $e$ to move in the direction of the arrow, carrying with it the index $f$. This movement corresponds to the amount of air exhausted from the space in front of the piston, that is to say it is the product of the speed of travel of the vehicle relative to the air and the time, so that the distance travelled by the vehicle relative to the air can be directly read on the scale $g$, which may be suitably divided or graduated into air kilometers or air miles for that purpose.

The above described illustrative embodiment of the invention shown in Fig. 1 is of course operated only up to the time that the piston $e$ shall reach its endmost position. Also the device is intended for use in measuring only relatively short distances of travel, for example the distance travelled during the take off run.

Figure 2:
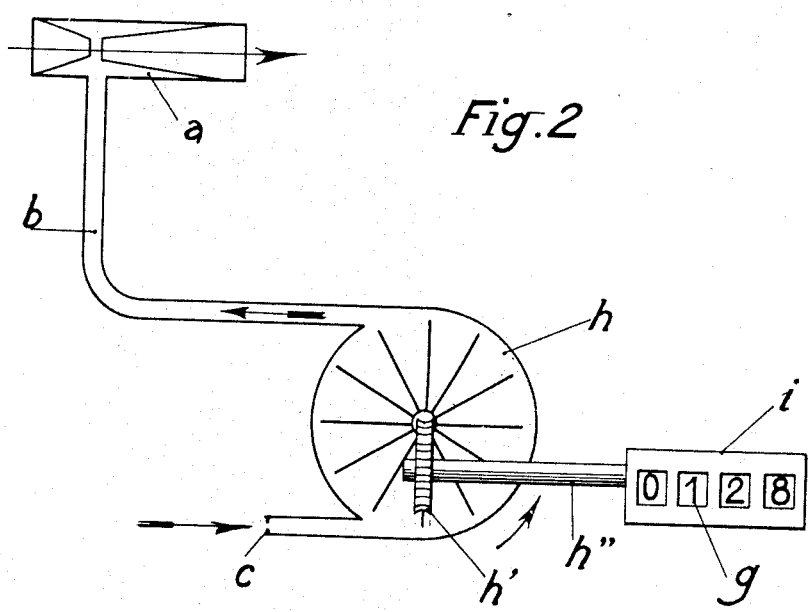
Fig. 2 is a diagrammatic sectional view of a further embodiment of the invention.

The illustrative embodiment shown in Fig. 2 corresponds in general to that described in relation to Fig. 1. In this other illustrative embodiment of the invention, there is also provided a suction or exhaust passage $b$ connected at one end to the narrowest part of the Venturi tube. In this embodiment of the invention however, the indicating means and actuating means of the measuring means at the other end of said suction tube comprise a counter $i$ and an air turbine $h$ respectively, which latter is set in revolution by the air suction, or current and actuates the counter through any suitable transmission means, as for example a worm gear $h'$ secured to the shaft $h''$ of the counter and driven by a worm on the turbine shaft. In this embodiment the constriction $c$ is provided in front of the air turbine, that is to say on that side of the turbine opposite to that on which the Venturi tube is situated.

The mode of operation in the second illustrative embodiment of the invention is practically the same as that of the first illustrative embodiment, except that the air sucked or drawn through the conduit $b$ effects rotation of the turbine wheel $h$, the speed of rotation of said wheel being proportionate to the speed of travel of the vehicle relative to the air. Therefore, by suitably connecting said counter to said turbine wheel, it becomes possible directly to measure or indicate on the dial of the latter, the distance travelled by the vehicle.

The opening or inside diameter of the constriction may be made variable by adjustment in any suitable manner. By adjustment of the cross section of said constriction opening the proportionality factor, that is to say the unit of the scale divisions or graduations upon the scale $g$ may be changed. It is therefore quite possible by adjustment of said cross section corresponding to the existing wind strength, so to graduate or divide the indicator means, that it no longer gives the distance travelled relative to the air but the distance travelled over the ground. As is well known, the distance travelled over the ground is always an unvariable fraction of the distance travelled relative to the air, assuming that the wind velocity remains constant.

Figure 3:
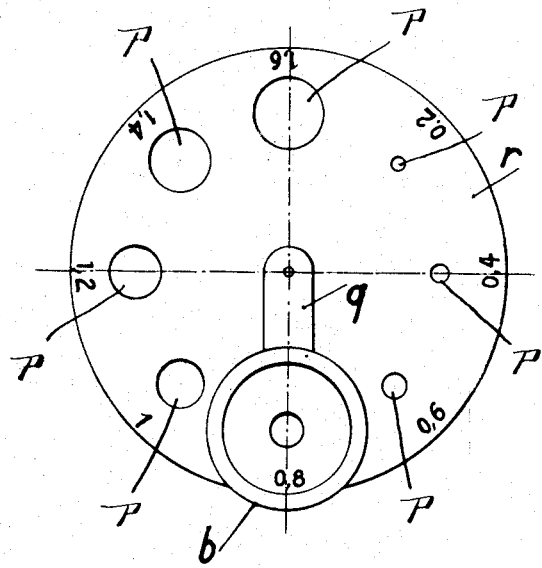
Figs. 3, 3a and 4, 4a show convenient illustrative means for variably adjusting the cross sectional area of this constriction $c$.
Figure 3A:
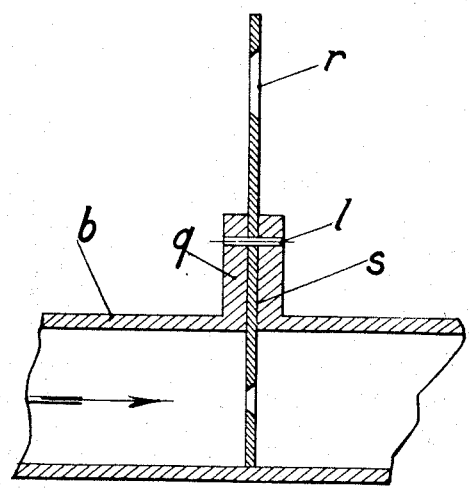

As a convenient means for providing a constriction of variably adjustable cross sectional area, I may, as shown in Figs. 3 and 3$a$, provide a disk $r$ having a plurality of ports $p$ of different diameters adjacent its periphery. Said disk $r$ fits in a slot $s$ provided in the wall of the tube or passage $b$ and in a lateral boss $q$ on said tube, in a plane at right angles to the longitudinal axis of said tube. Said disk may be rotated about a shaft $l$ having its end mounted in the walls of said boss, said disk closing said passage $b$ except for the ports therein. In this way anyone of the different ports $r$, the size of which may be graduated according to the scale factor, can be brought into operative position within the tube or passage $b$ and the cross sectional area of the constriction $c$ thus variably adjusted as desired. Herein eight ports $r$ are provided, but is will be apparent that a greater or lesser number may be used if desirable within the scope of my invention.

Figure 4:
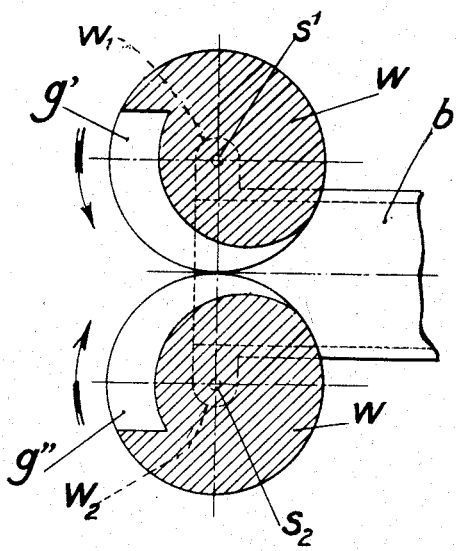
Figure 4A:
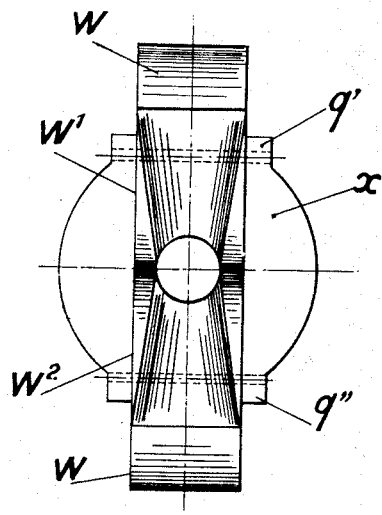

In Figs. 4 and 4$a$, I have shown another illustrative means to accomplish the same object. In this modification I have provided two disks $w$, $w$ engaging slots $w'$, $w^2$ respectively provided in the same plane in the end wall $x$ closing the end of said passage and in opposite sides of the wall of the tube or passage $b$, said slots being in a plane at right angles to said passage. Said disks are mounted for rotation about shafts $s'$, $s^2$ respectively, mounted in bosses $q'$, $q''$ slotted to receive said disks. Said disks are provided throughout a portion of their lateral surface with grooves $g'$, $g''$ of gradually increasing depth from one end to the other. Said slots are coextensive and symmetrical and the disk peripheries are in frictional engagement with each other, so that, by rotating one disk the other will be rotated, thus varying the cross sectional area of the constriction as desired.

The device may also be used for measuring the take off run of an aeroplane or a hydroaeroplane, that is to say the distance that an aeroplane must roll along the ground or a hydroaeroplane must glide upon the water before it leaves or rises from the ground or water respectively. To this end, suitable means may be provided according to my invention to act upon the apparatus, preferably automatically at the start and end of the take off run. Any suitable means may be provided for that purpose within the scope of my invention that is, for example, a valve $k$ may be provided in the passage $b$ which will be kept automatically open so long as the plane is in contact with the ground or with the water and which may be automatically closed when the plane leaves the ground or the water. Any suitable controlling means for said valve may be used, one convenient means for that purpose being a float $m$ in the case of hydroearoplanes and a stop $n$ in the case of aeroplanes, said float and said stop engaging the water or the ground respectively and being adapted to open the valve and close it. In the illustrative embodiment of the invention, the stop $n$ may for example operate the valve through a shaft $k'$ secured to said valve. Said stop $n$ will preferably be yielding and maintained in contact with the ground by a spring *o* for example, when the aeroplane is at rest, said stop being then in forward position as shown in the dotted line in Fig. 5. The spring *o* secured at one end of said stop and at the other end to a bracket *o'* tends to maintain the stop in forward position and to return it to said forward position if the stop be displaced against the action of the spring *o*. In this forward position of the stop *n* the valve *k* is closed. When the aeroplane starts, travelling in the direction indicated by the arrow in Fig. 5, the stop *n*, by its contact with the ground will be displaced or swang backwardly into the position shown in full lines in said Fig. 5, thus turning the valve *k* into open position as shown in said figure. This condition continues so long as the aeroplane continues to travel on the ground, but as soon as it rises from the ground the stop *n* also leaves the ground and the spring *o* promptly draws it into forward position closing the valve.

The float *m* may operate the valve in a manner similar to the mode of operation of the stop *n*, except that the float is adapted to engage the water instead of the ground, as shown in Fig. 6. The float *m* is connected to the shaft *k'* of the valve *k* by a rod *k''*. When the hydroaeroplane is at rest on the water before starting the float having been placed in forward position (dotted lines Fig. 6) in which position the valve is closed, the float will be maintained in said position by the spring *o*. When the hydroaeroplane starts, the float will be displaced or swang backwardly into the full line open position (Fig. 6) by the action of the water and will remain in that position till the hydroaeroplane rises from the water. When this occurs the float being no longer in contact with the water will be drawn into forward position by the spring *o*, thus closing the valve *k*.

The length of the take off run of an hydroaeroplane or aeroplane may thus be readily measured.

It is to be understood that the word "Vehicle" as used in this specification and claims is intended to include land, water and air vehicles.

I am aware that my invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

I claim:

1. In apparatus for measuring distance traveled by a vehicle, in combination, a Venturi tube carried by said vehicle; means forming a passage connected to the throat of the Venturi tube and communicating with atmosphere; a constriction provided in said passage, said Venturi tube and said constriction cooperating to produce within said passage, when said Venturi tube is operative, a flow of air proportional to the speed of travel of said vehicle; distance indicating means; and operating means for the latter actuated by said flow of air.

2. In apparatus for measuring distance traveled by a vehicle, in combination, means carried by said vehicle and operated by movement thereof relative to the ambient air to produce within said apparatus a flow of air; means to act upon said flow of air to render said flow of air directly proportional to the speed at which said vehicle is traveling; an indicator; and actuating means for said indicator operated by said flow of air.

3. In apparatus for measuring distance traveled by a vehicle, in combination, a Venturi tube carried by said vehicle; means forming a passage connected to the throat of said Venturi tube and communicating with atmosphere; a constriction provided in said passage, said Venturi tube and said constriction cooperating to produce within said passage, when said Venturi tube is operative, a flow of air proportional to the speed of travel of said vehicle; distance indicating means; actuating means for the latter actuated by said flow of air; and means to stop said flow of air when desired.

4. In apparatus for measuring distance traveled by a vehicle, in combination, a Venturi tube carried by said vehicle; means forming a passage connected to the throat of said Venturi tube and communicating with atmosphere; a constriction provided in said passage, said Venturi tube and said constriction cooperating to produce a flow of air within said passage proportional to the speed of travel of said vehicle when said Venturi tube is operative; distance indicating means; actuating means for the latter connected with said passage and actuated by said flow of air; and a valve in said passage to stop the flow of air when desired.

5. In apparatus for measuring distance traveled by a vehicle, in combination, a Venturi tube carried by said vehicle; means forming a passage connected to the throat of the said Venturi tube and open to atmosphere; a constriction provided in said passage to produce a flow of air within said passage proportional to the speed of travel of said vehicle when said Venturi tube is operative; distance indicating means; actuating means for said distance indicating means, actuated by said flow of air; and adjusting means to vary the cross sectional area of the opening of said constriction.

6. In apparatus for measuring distance traveled by a vehicle, in combination, a Venturi tube carried by said vehicle, and operated by movement thereof relative to the ambient air; means forming a passage connected to the throat of said Venturi tube and communicating with atmosphere; a constriction in said passage, said Venturi tube and constriction cooperating to induce within said apparatus a flow of air proportional to the speed at which said vehicle is traveling; and measuring means actuated by said flow of air to measure said flow of air in said apparatus.

7. In apparatus for measuring distance traveled by a vehicle, in combination, a Venturi tube carried by said vehicle and operated by movement thereof relative to the ambient air; means forming a passage connected to the throat of said Venturi tube and communicating with atmosphere; a constriction in said passage, said Venturi tube and said constriction cooperating to produce within said apparatus a flow of air proportional to the speed at which said vehicle is traveling; measuring means actuated by said flow of air to measure said flow of air; and means adjustable to vary the cross sectional area of the opening of said constriction.

8. In apparatus for measuring distance traveled by a vehicle, in combination, a Venturi tube carried by said vehicle and operated by movement thereof relative to the ambient air; means forming a passage connected to the throat of said Venturi tube and open to atmosphere; a constriction in said passage, said Venturi tube and said constriction cooperating to induce within said apparatus a flow of air proportional to the speed at which said vehicle is traveling; measuring means actuated by said flow of air to measure said flow of air; and means to stop said flow of air when desired.

9. In apparatus for measuring distance traveled by a vehicle, in combination, means carried by said vehicle, and operated by movement thereof relative to the ambient air, to produce a flow of air within the apparatus; means to act upon said flow of air to render said flow of air directly proportional to the speed of travel of said vehicle; distance indicating means; and a turbine operated by said flow of air to actuate said distance indicating means.

10. In apparatus for measuring distance traveled by an aircraft over a sustaining surface, in combination, distance measuring means; operating means to render said distance measuring means operative and inoperative; and means operated by the sustaining surface at predetermined points respectively in the travel of said vehicle to operate said operating means.

11. In apparatus for measuring distance traveled by a vehicle, in combination, means forming a passage open to atmosphere; means carried by said vehicle and operatively connected to said passage; a constriction in said passage, said second mentioned means being actuated by travel of said vehicle relative to the ambient air and when thus actuated cooperating with said constriction to produce within said passage a flow of air proportional to the speed of travel of said vehicle; distance indicating means; and a turbine operated by said flow of air to actuate said distance indicating means.

12. In apparatus for measuring distance traveled by a vehicle, in combination, a Venturi tube carried by said vehicle; means forming a passage connected to the throat of said Venturi tube and communicating with atmosphere; and a constriction provided in said passage, said Venturi tube and said constriction cooperating to produce within said passage, when said Venturi tube is operative, a flow of air proportional to the speed of travel of said vehicle.

13. In apparatus for measuring distance traveled by aircraft, in combination, means forming a passage communicating with atmosphere; a constriction in said passage; means carried by the aircraft and operated by movement thereof relative to the ambient air to produce within said passage of flow of air; distance indicating means; and actuating means for said distance indicating means, said actuating means being located in the path of said flow of air and being operated by the latter.

In testimony whereof, I have signed my name to this specification.

WALDEMAR MÖLLER.